(12) United States Patent
Cheng

(10) Patent No.: US 8,188,669 B2
(45) Date of Patent: May 29, 2012

(54) DECORATIVE LAMP FOR DISPLAYING SNOWING OR WATER-FLOWING PATTERN

(76) Inventor: Hon Kwok Cheng, Kowloon (HK)

( * ) Notice: Subject to any disclaimer, the term of this patent is extended or adjusted under 35 U.S.C. 154(b) by 290 days.

(21) Appl. No.: 12/569,765

(22) Filed: Sep. 29, 2009

(65) Prior Publication Data

US 2010/0320920 A1    Dec. 23, 2010

(30) Foreign Application Priority Data

Jun. 19, 2009   (CN) ..................... 2009 2 0159882 U

(51) Int. Cl.
*H05B 37/00* (2006.01)
(52) U.S. Cl. ............. 315/185 R; 315/185 S; 315/200 R; 315/312; 315/291
(58) Field of Classification Search .............. 315/185 R, 315/185 S, 312; 362/806, 640
See application file for complete search history.

(56) References Cited

U.S. PATENT DOCUMENTS

| 2004/0066148 A1* | 4/2004 | Oskorep et al. ............ 315/185 S |
| 2005/0110426 A1* | 5/2005 | Shao .......................... 315/185 R |
| 2008/0238345 A1* | 10/2008 | Jaan .............................. 315/325 |

* cited by examiner

*Primary Examiner* — Douglas W Owens
*Assistant Examiner* — Jonathan Cooper
(74) *Attorney, Agent, or Firm* — McNeely, Hare & War, LLP; Kevin J. McNeely

(57) ABSTRACT

The present invention relates to a decorative lamp for displaying snowing and water-flowing pattern, comprising a rectification power supply, a controller and a lamp series section connected in sequence, wherein the lamp series section is composed of a plurality of LED strings connected in parallel or in series. The controller comprises an integrated circuit including a plurality of outputs and switch devices for controlling sequentially flashing of the LED strings. Each of the switch devices has two terminals electrically connected in series to a loop of the respective LED string. Each of the LED strings has respective terminal connected to a common terminal which is a direct current output terminal of the rectification power supply, the other terminal of the LED string is connected to the respective switch device.

1 Claim, 4 Drawing Sheets

DECORATIVE LAMP FOR DISPLAYING SNOWING OR WATER-FLOWING PATTERN

CROSS REFERENCE TO RELATED APPLICATION

This utility patent application claims priority to Chinese Patent Application No. 200920159882.0 filed on Jun. 19, 2009.

TECHNICAL FIELD

The present invention relates to a decorative lamp for decorating walls, windows, doors, grounds, trees or the like when it is hanging thereon or grounded with different styles.

BACKGROUND ART

Decorative lamps currently available in the market generally produce chasing and flashing effects with four outputs and eight functions. However, the effects produced by these decorative lamps are monotonous, and the wiring arrangement of these decorative lamps is complicated and casts numerous wires. Also, this type of decorative lamps does not allow for mass production, and therefore, does not satisfy the market demand.

SUMMARY OF THE INVENTION

It is an object of the present invention to provide a decorative lamp for displaying alternately snowing or water-flowing pattern, in order to solve the problems associated with monotonous decorative effects, complicated wiring arrangement, and failure to realize mass production and to satisfy the market demand.

The decorative lamp of the present invention comprises a rectification power supply, a specialized IC controller and a lamp series section connected in sequence. The lamp series section is composed of a plurality of LED strings connected in parallel or in series. The controller comprises an integrated circuit including a plurality of outputs and switch devices for controlling sequentially flashing of the LED strings. Each of the switch devices has two terminals electrically connected in series to a loop of the respective LED string. The LED strings have respective terminals connected to a common terminal, which is a direct current output terminal of the rectification power supply, the other respective terminals of the LED strings are connected to the respective switch devices. The integrated circuit has a power supply terminal connected to the direct current output terminal of the rectification power supply, and the plurality of outputs of the integrated circuit are connected to control terminals of the switch devices, respectively.

The decorative lamp of the present invention has the advantages that the wiring arrangement is simple and minimizes the use of electrical wires, LEDs are controlled to flash sequentially by the controller so as to enable the LEDs to glow in a continuous and dynamic manner, thereby displaying alternately snowing or water-flowing pattern. In addition, use of the LEDs as light sources is able to generate novel and colourful lighting effects.

DETAILED DESCRIPTION OF THE INVENTION

Figure 1:
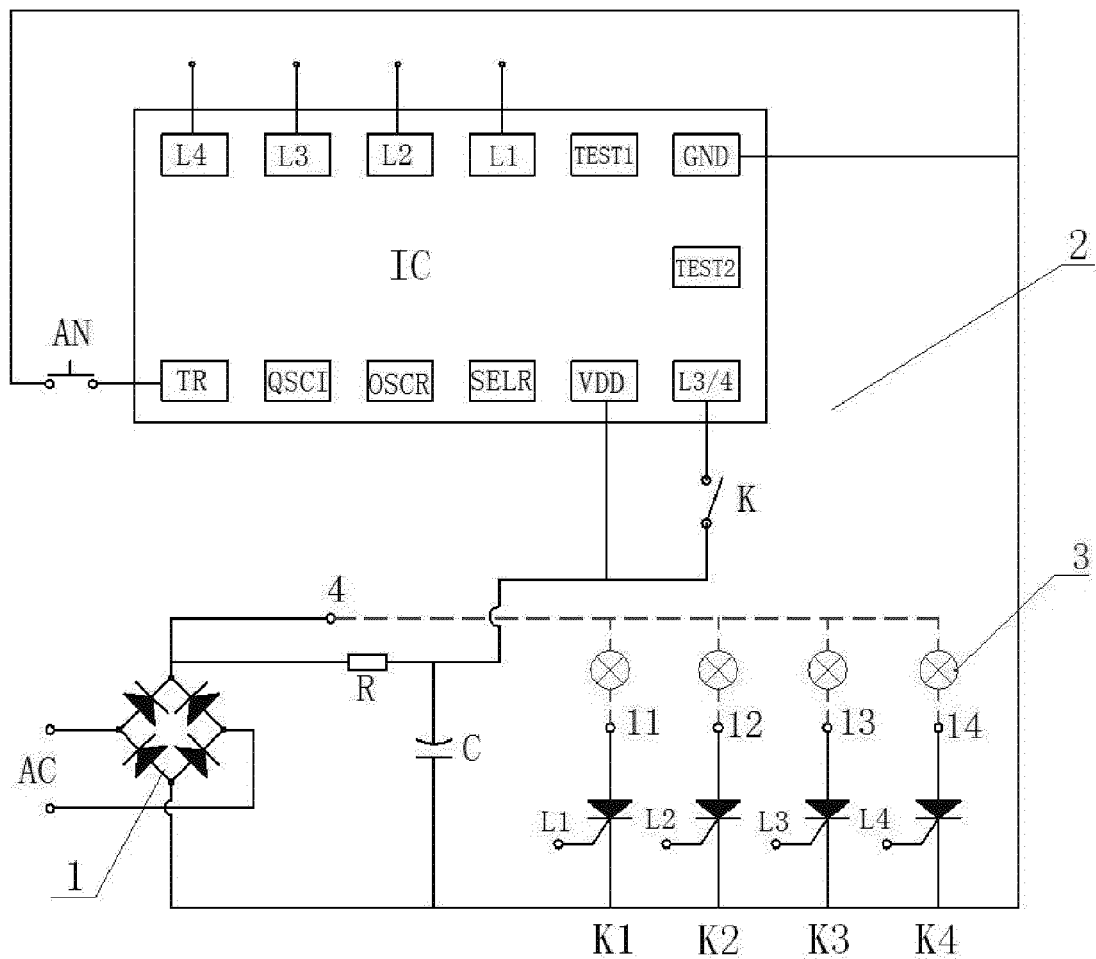
FIG. 1 shows a schematic diagram of an overall configuration of the decorative lamp of the present invention.

Referring to FIG. 1, a decorative lamp of the present invention is shown, which comprises a rectification power supply 1, a specialized IC controller 2, and a lamp series section 3 composed of a plurality of LED strings connected in parallel or in series. The controller 2 comprises an integrated circuit IC including three to four outputs and silicon controlled switch devices K1-K4 for controlling sequentially flashing of the LED strings. Each of the switch devices has two terminals electrically connected in series to a loop of the respective LED string. The LED strings have respective terminals connected to one end of the lamp series section 3 which is then connected to a common terminal 4, and the common terminal 4 is a direct current output terminal of the rectification power supply 1. The other terminals of the LED strings are connected to the other end of the series lamp 3 which is then connected to positive poles of the switch devices, while negative poles of the switch devices are connected to a negative pole of the rectification power supply 1. The integrated circuit IC has a power supply terminal VDD connected to a positive pole of the rectification power supply 1 through a resistor R. The integrated circuit IC also has a terminal GND connected to the negative pole of the rectification power supply 1, and a terminal TR connected to the GND through a switch AN. The four outputs L1-L4 of the integrated circuit IC are connected to control terminals of the four switch devices K1-K4, respectively.

Figure 2:
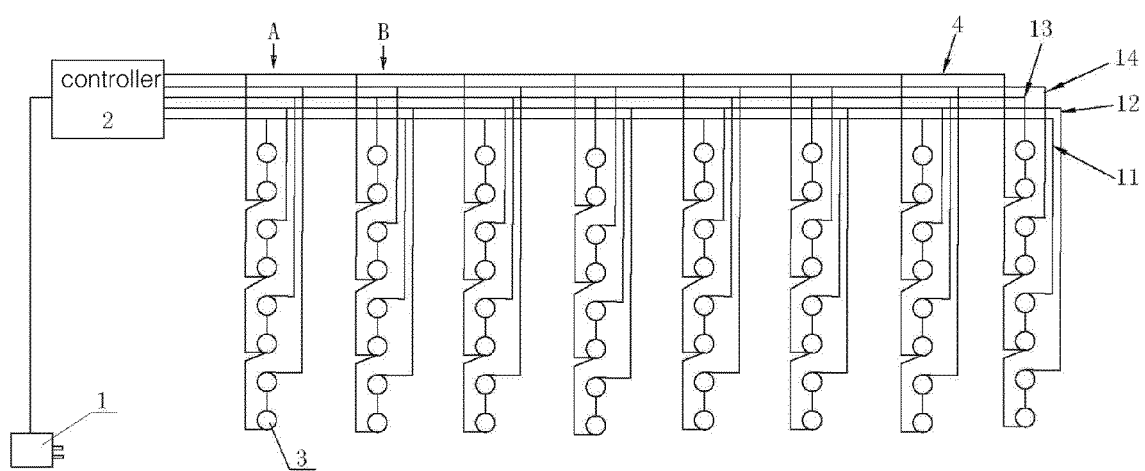
FIG. 2 shows a schematic diagram of a circuit of a first embodiment of the lamp series section of the present invention.

Referring to FIG. 2, the lamp series section 3 is composed of a first LED string A and a second LED string B, or is composed by parallel connection of a plurality of the first LED strings A and a plurality of the second LED strings B. In FIG. 2, four sets of the first LED strings and four sets of the second LED strings connected in parallel are illustrated.

One or more LEDs of the first LED string A are connected in series to form a unit, the adjacent units have respective terminals connected to the common terminal of the integrated circuit, while the other terminals connected to, from top to bottom sequentially, a first to a fourth outputs of the integrated circuit, respectively.

One or more LEDs of the second LED string B are connected in series to form a unit, the adjacent units have respective terminals connected to the common terminal of the integrated circuit. The other terminals of the two units at the upper of the second LED string are connected to, from top to bottom sequentially, the third and the fourth outputs of the integrated circuit, respectively, while the other terminals of the two units at the lower of the second LED string are connected to, from top to bottom sequentially, the first and the second outputs of the integrated circuit, respectively.

Figure 3:
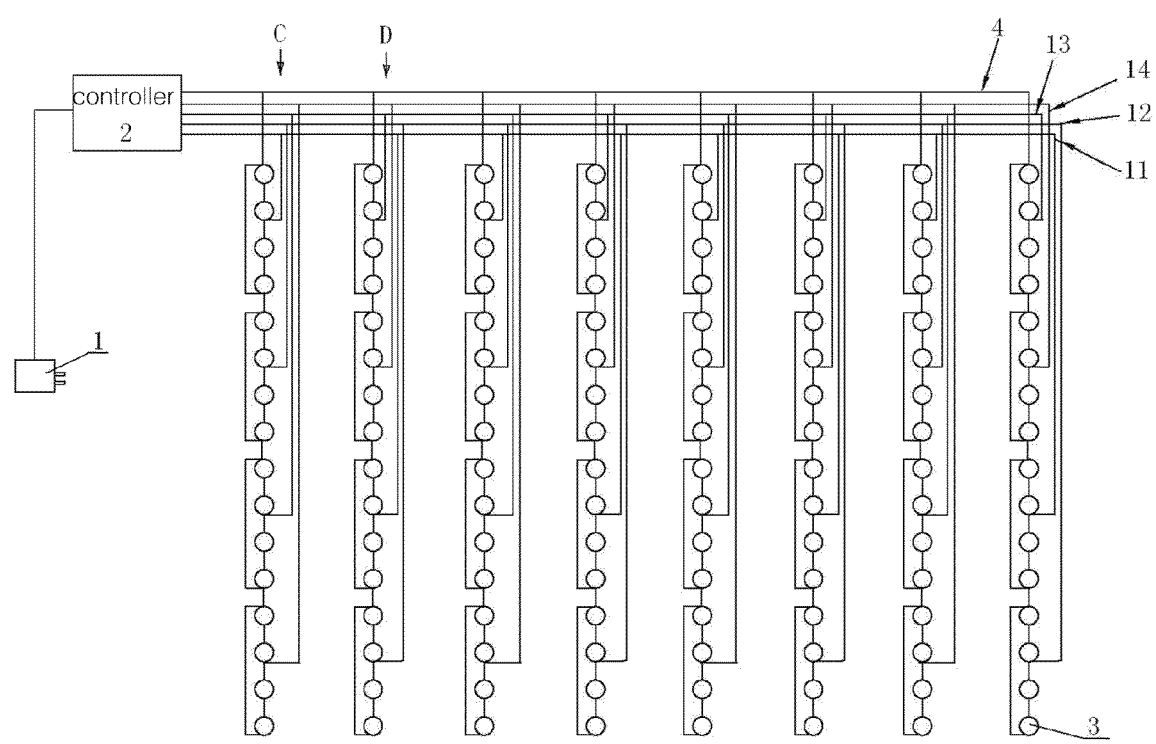
FIG. 3 shows a schematic diagram of a circuit of a second embodiment of the lamp series section of the present invention.

Referring to FIG. 3, the lamp series section 3 is composed of a first LED string C and a second LED string D, or is composed by parallel connection of a plurality of the first LED strings C and a plurality of the second LED strings D. In FIG. 3, four sets of the first LED strings and four sets of the second LED strings connected in parallel are illustrated.

One or more LEDs of the first LED string C are connected in series to form a series unit, and at least two of these series units are connected in parallel to form a parallel unit. The adjacent parallel units have respective terminals connected to the common terminal of the integrated circuit, while the other terminals connected to, from top to bottom sequentially, a first to a fourth outputs of the integrated circuit, respectively.

One or more LEDs of the second LED string D are connected in series to form a series unit, and at least two of these series units are connected in parallel to form a parallel unit. The adjacent parallel units have respective terminals connected to the common terminal of the integrated circuit. The other terminals of the two parallel units at the upper of the second LED string are connected to, from top to bottom sequentially, the third and the fourth output terminals of the integrated circuit, respectively, while the other terminals of the two parallel units at the lower of the second LED string are connected to, from top to bottom sequentially, the first and the second output terminals of the integrated circuit, respectively.

Figure 4:
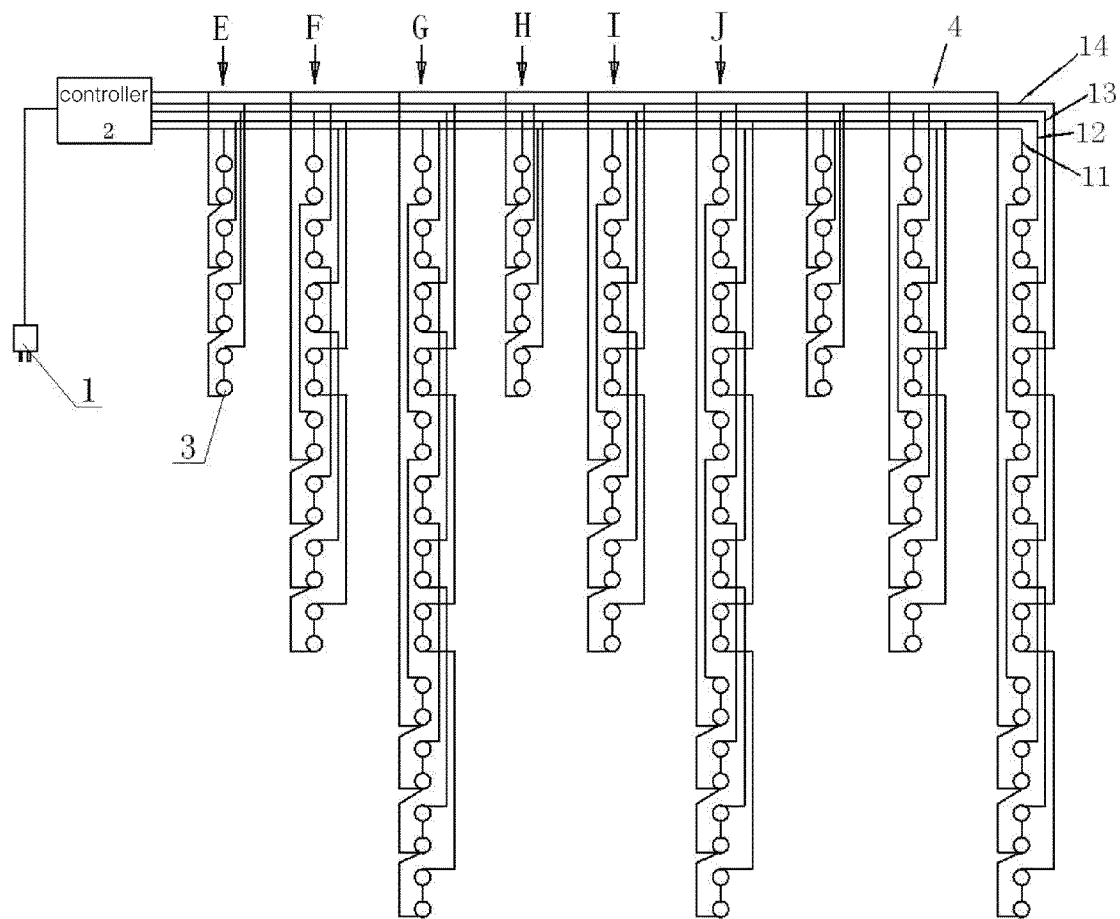
FIG. 4 shows a schematic diagram of a circuit of a third embodiment of the lamp series section of the present invention.

Referring to FIG. 4, the lamp series section is composed of a first LED string E or H, a second LED string F or I, and a third LED string G or J, or is composed by parallel connection of a plurality of the first, second and third LED strings.

One or more LEDs of the first LED string E are connected in series to form a series unit. The adjacent series units have respective terminals connected to the common terminal of the integrated circuit, while the other terminals connected to, from top to bottom sequentially, a first to a fourth outputs of the integrated circuit, respectively. As an alternative, the LEDs of the first LED string H can be connected in such a manner that the other terminals of the two series units at the upper of four series units of the first LED string H are connected to, from top to bottom sequentially, the third and the fourth output terminals of the integrated circuit, respectively, and the other terminals of the two series units at the lower of the four series units of the first LED string H are connected to, from top to bottom sequentially, the first and the second outputs of the integrated circuit, respectively.

The second LED string F is composed of a upper LED string and a lower LED string, the upper and lower LED strings are respectively composed of four series units from top to bottom sequentially, each of the series units comprising one or more LEDs connected in series, and the two series units at the same position from the upper and lower LED strings are in series connection. The other terminals of the four series units of the lower LED string are jointly connected to the common terminal of the integrated circuit. The other terminals of the two series units at the upper of the four series units of the upper LED string are connected to, from top to bottom sequentially, the third and the fourth outputs of the integrated circuit, respectively, while the other terminals of the two series units at the lower of the four series units of the upper LED string are connected to, from top to bottom sequentially, the first and the second outputs of the integrated circuit, respectively. As an alternative, the LEDs of the second LED string I can be connected in such a manner that the other terminals of the four series units of the upper LED string are connected to, from top to bottom sequentially, the first to the fourth outputs of the integrated circuit, respectively.

The third LED string G is composed of an upper LED string, an intermediate LED string and a lower LED string, the upper, intermediate and lower LED strings are respectively composed of four series units from top to bottom sequentially, each of the series units comprising one or more LEDs connected in series, and three series units at the same position from the upper, intermediate and lower LED strings are in series connection. The other terminals of the four series units of the lower LED string are jointly connected to the common terminal of the integrated circuit. The other terminals of the four series units of the upper LED string are connected to, from top to bottom sequentially, the first to the fourth outputs of the integrated circuit, respectively. As an alternative, the LEDs of the third LED string J can be connected in such a manner that the other terminals of the two series units at the upper of the four series units of the upper LED string are connected to, from top to bottom sequentially, the third and the fourth outputs of the integrated circuit, respectively, and the other terminals of the two series units at the lower of the four series units of the upper LED string are connected to, from top to bottom sequentially, the first and the second outputs of the integrated circuit, respectively.

FIG. 4 illustrates an embodiment of the present invention, in which the decorative lamp is composed by parallel connection of three sets of LED strings, from left to right sequentially, the first LED string E, the second LED string F, the third LED string G; the first LED string H, the second LED string I, the third LED string J; and the first LED string E, the second LED string F, the third LED string G.

In the controller 2 of the present invention, CMOS devices are used in the integrated circuit with three to four of outputs for controlling sequentially flashing of the LED strings. The CMOS devices have low power loss, wide working voltage, and strong interference rejection capability. Flashing time (1-$\frac{1}{256}$ seconds) of each output of the CMOS devices can be selected by a build-in resistor or by connection to an external resistor. The flashing signals are outputted from three outputs when the terminal L3/4 of the controller is disconnected, and the flashing signals are outputted from four outputs when the terminal VDD of the controller 2 is connected. This is controlled and selected by a switch K.

The invention claimed is:

1. A decorative lamp for displaying alternately snowing or water-flowing pattern, comprising:
a rectification power supply, a controller, and a lamp series section connected in sequence,
wherein
the lamp series section is composed of a plurality of LED strings connected in parallel or in series; the controller comprises an integrated circuit including a plurality of outputs and switch devices for controlling sequentially flashing of the LED strings, each of the switch devices having two terminals electrically connected in series to a loop of the respective LED string, each of the LED strings has respective terminal connected to a common terminal which is a direct current output terminal of the rectification power supply, the other terminal of the LED string is connected to the respective switch device; the integrated circuit has a power supply terminal connected to the direct current output terminal of the rectification power supply, the plurality of outputs of the integrated circuit are connected to control terminals of the switch devices, respectively;
wherein the lamp series section is composed of a first LED string, a second LED string and a third LED string, or is composed by parallel connection of a plurality of the first, second and third LED strings;
one or more LEDs of the first LED string are connected in series to form a series unit, the adjacent series units have respective terminals connected to the common terminal of the integrated circuit, while the other terminals connected to, from top to bottom sequentially, a first to a fourth outputs of the integrated circuit, respectively; or the two series units at the upper of the four series units of the first LED string having the other terminals connected to, from top to bottom sequentially, the third and the fourth output terminals of the integrated circuit, respectively, while the two series units at the lower of the four series units of the first LED string having the other terminals connected to, from top to bottom sequentially, the first and the second outputs of the integrated circuit, respectively;

the second LED string is composed of a upper LED string and a lower LED string, the upper and lower LED strings are respectively composed of four series units from top to bottom sequentially, each of the four series units comprising one or more LEDs connected in series, and the two series units at the same position from the upper and lower LED strings being in series connection; the four series units of the lower LED string have the other terminals jointly connected to the common terminal of the integrated circuit; the two series units at the upper of the four series units of the upper LED string have the other terminals connected to, from top to bottom sequentially, the third and the fourth outputs of the integrated circuit, respectively, while the two series units at the lower of the four series units of the upper LED string have the other terminal connected to, from top to bottom sequentially, the first and the second outputs of the integrated circuit, respectively; or the four series units of the upper LED string have the other terminals connected to, from top to bottom sequentially, the first to the fourth outputs of the integrated circuit, respectively;

the third LED string is composed of an upper LED string, an intermediate LED string and a lower LED string, the upper, intermediate and lower LED strings are respectively composed of four series units from top to bottom sequentially, each of the four series units comprising one or more LEDs connected in series, and three series units at the same position from the upper, intermediate and lower LED strings being in series connection; the four series units of the lower LED string have the other terminals jointly connected to the common terminal of the integrated circuit; the four series units of the upper LED string have the other terminals connected to, from top to bottom sequentially, the first to the fourth outputs of the integrated circuit, respectively; or the two series units at the upper of the four series units of the upper LED string have the other terminals connected to, from top to bottom sequentially, the third and the fourth outputs of the integrated circuit, respectively, while the two series units at the lower of the four series units of the upper LED string have the other terminals connected to, from top to bottom sequentially, the first and the second outputs of the integrated circuit, respectively.

* * * * *